(12) United States Patent
Magnusson et al.

(10) Patent No.: US 11,755,838 B2
(45) Date of Patent: Sep. 12, 2023

(54) MACHINE LEARNING FOR JOINT RECOGNITION AND ASSERTION REGRESSION OF ELEMENTS IN TEXT

(71) Applicant: Smart Information Flow Technologies, LLC, Minneapolis, MN (US)

(72) Inventors: Ian H. Magnusson, Cambridge, MA (US); Scott Ehrlich Friedman, Minneapolis, MN (US); Sonja M. Schmer-Galunder, San Francisco, CA (US)

(73) Assignee: Smart Information Flow Technologies, LLC, Minneapolis, MN (US)

( * ) Notice: Subject to any disclaimer, the term of this patent is extended or adjusted under 35 U.S.C. 154(b) by 423 days.

(21) Appl. No.: 16/948,332

(22) Filed: Sep. 14, 2020

(65) Prior Publication Data
US 2022/0083739 A1    Mar. 17, 2022

(51) Int. Cl.
*G06F 40/295* (2020.01)
*G06N 20/00* (2019.01)
(Continued)

(52) U.S. Cl.
CPC .......... *G06F 40/295* (2020.01); *G06F 40/284* (2020.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2004/0158454 A1* | 8/2004 | Polanyi | G06F 40/253 704/4 |
| 2019/0272317 A1* | 9/2019 | Wroczynski | G06F 40/216 |

(Continued)

OTHER PUBLICATIONS

Eberts, Markus, "Span-based Joint Entity and Relation Extraction with Transformer Pre-training", arXiv:1909.07755v3 [cs.CL], (Nov. 19, 2019), 8 pgs.

(Continued)

*Primary Examiner* — Antim G Shah
(74) *Attorney, Agent, or Firm* — Young Basile Hanlon & MacFarlane, P.C.

(57) ABSTRACT

A computing machine receives an input comprising unstructured text. The computing machine identifies, within the unstructured text, one or more entities using a named entity recognition (NER) engine in a trained machine learning model. The trained machine learning model embeds tokens from the text into a vector space and uses generated embeddings to identify one or more tokens as being associated with the one or more entities. The computing machine determines, using the trained machine learning model that identifies the one or more entities and based on the embedded tokens, an assertion applied, within the text, to at least one entity. The assertion is represented as a vector in a multi-dimensional space. Each dimension corresponds to a part of the assertion. The trained machine learning model is a span-level model that both identifies the one or more entities and determines the assertion based on candidate spans of tokens.

15 Claims, 9 Drawing Sheets

(51) Int. Cl.
   *G06N 5/04*      (2023.01)
   *G06F 40/284*    (2020.01)

(56)          References Cited

U.S. PATENT DOCUMENTS

2020/0153851 A1*  5/2020  Bulut ................. H04L 63/1433
2021/0406706 A1* 12/2021  Hasan ..................... G06F 40/49
2022/0067282 A1*  3/2022  Suhara .................... G06F 16/35

OTHER PUBLICATIONS

Field, Anjalie, et al., "Entity-Centric Contextual Affective Analysis", Proceedings of the 57th Annual Meeting of the Association for Computational Linguistics, (2019), 2550-2560.

Zhou, Jie, et al., "End-to-end Learning of Semantic Role Labeling Using Recurrent Neural Networks", Proceedings of the 53rd Annual Meeting of the Association for Computational Linguistics and the 7th International Joint Conference on Natural Language Processing, (2015), 1127-1137.

* cited by examiner

MACHINE LEARNING FOR JOINT RECOGNITION AND ASSERTION REGRESSION OF ELEMENTS IN TEXT

GOVERNMENT RIGHTS

This invention was made with government support under FA8650-18-P-6895 awarded by the Air Force Research Laboratory. The government has certain rights in the invention.

TECHNICAL FIELD

Embodiments pertain to artificial intelligence. Some embodiments relate to a machine learning model that jointly recognizes entities in text and determines assertion(s) applied, within the text, to at least one of the recognized entities. Some embodiments relate to identifying entities in unstructured text and determining assertion(s) applied to the identified entities.

BACKGROUND

Computerized textual analysis is used for many different purposes, for example, information retrieval and information extraction. Machine learning model(s) may be applied to computerized textual analysis. Some problems in the computerized textual analysis space include identifying entities in text and determining assertion(s) (e.g., moral assertions, quality assertions or other types of assertions) applied to the identified entities.

SUMMARY

Figure 1:
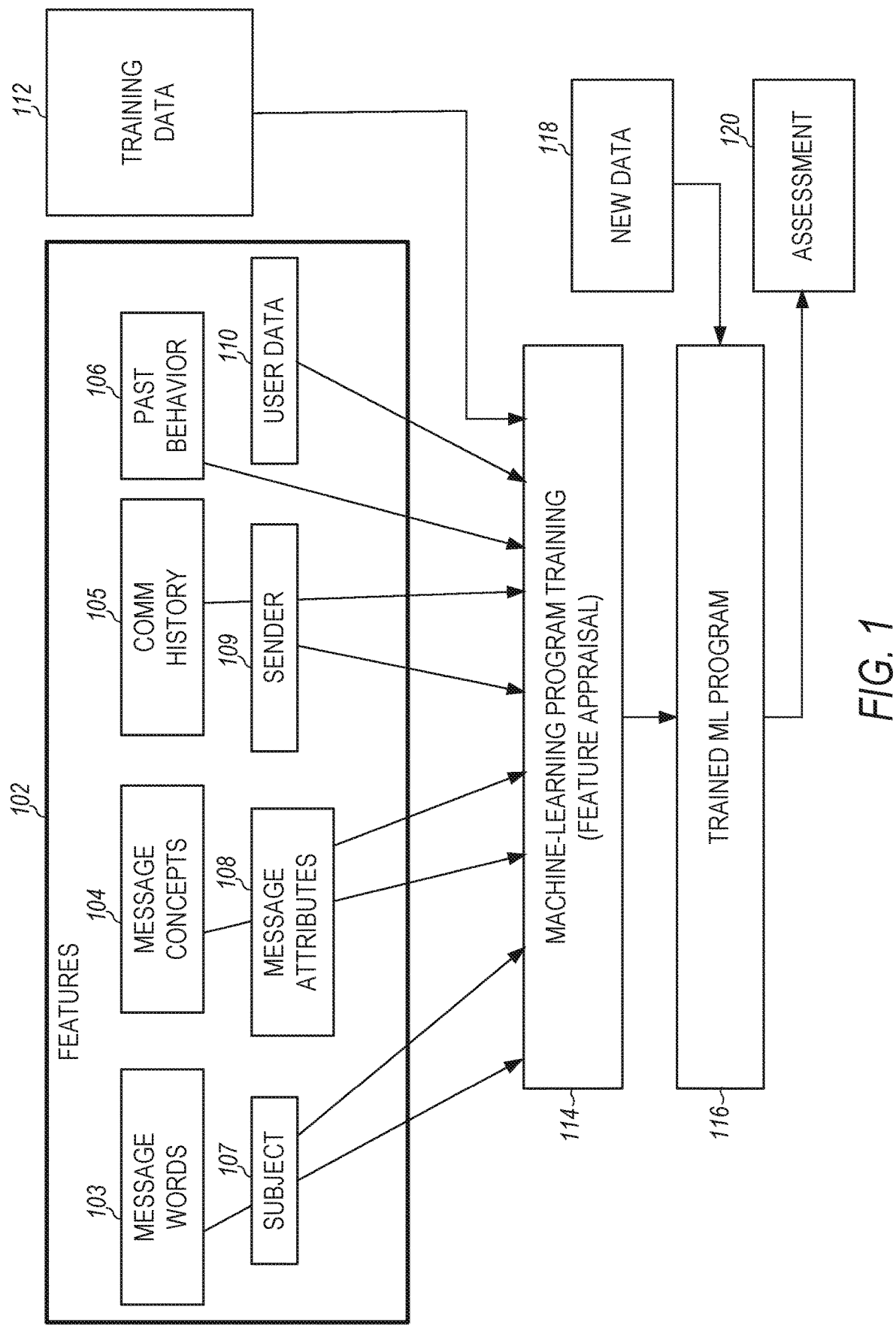
FIG. 1 illustrates the training and use of a machine-learning program, in accordance with some embodiments.

The present disclosure generally relates to machines configured to provide machine learning models, including computerized variants of such special-purpose machines and improvements to such variants. In particular, the present disclosure addresses training and evaluating machine learning model behavior over data segments.

According to some aspects, an inference method includes receiving, at one or more computing machines, an input comprising unstructured text. The method includes identifying, within the unstructured text, one or more entities using a named entity recognition (NER) engine in a trained machine learning model, wherein the trained machine learning model embeds tokens from the text into a vector space and uses generated embeddings to identify one or more tokens as being associated with the one or more entities. The method includes determining, using the trained machine learning model that identifies the one or more entities and based on the embedded tokens, an assertion applied, within the text, to at least one entity, wherein the assertion is represented as a vector in a multi-dimensional space, wherein each dimension corresponds to a part of the assertion, wherein the trained machine learning model is a span-level model that both identifies the one or more entities and determines the assertion based on candidate spans of tokens. The method includes providing an output associated with the assertion applied to the at least one entity.

According to some aspects, a training method includes accessing, at one or more computing machines, a first dataset comprising labeled entities in a first collection of text documents. The method includes accessing, at the one or more computing machines, a second dataset indicating assertions applied, within the first collection of text documents, to the labeled entities, wherein each assertion is represented as a vector in a multi-dimensional space, wherein each dimension corresponds to a part of the assertion. The method includes training, using a supervised learning engine, a machine learning model comprising a named entity recognition (NER) engine to identify entities in text and assertions applied, by the text, to identified entities, wherein the training to identify the entities and the training to identify the assertions leverage backpropagation to backpropagate into a common embedding layer for both the entities and the assertions, wherein the machine learning model is a span-level model that both identifies entities and determines assertions based on candidate spans of tokens. The method includes providing an output representing the trained machine learning model.

Some aspects include a machine-readable medium storing instructions to perform the above method(s). Some aspects include a system comprising processing circuitry and memory, the memory storing instructions which, when executed by the processing circuitry, cause the processing circuitry to perform the above method(s). Some aspects include an apparatus comprising means for performing the above method(s).

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, machine learning model(s) may be applied to computerized textual analysis. Some problems in the computerized textual analysis space include identifying entities in text and determining assertion(s) (e.g., moral assertions, quality assertions or other types of assertions)

applied to the identified entities. Some embodiments of the disclosed technology are directed to identifying entities in unstructured text and determining assertion(s) applied to the identified entities. Some embodiments may be implemented using supervised machine learning.

One motivation for some embodiments may be to detect linguistic indicators of imminent adverse action, for example, acting violently against some individual or group. This may be detected from text such as blog post(s), social media posts, publicly published manifestos, and the like.

During the inference phase, a computing machine receives an input comprising unstructured text. The computing machine identifies, within the unstructured text, one or more entities using a named entity recognition (NER) engine in a trained machine learning model. The trained machine learning model embeds tokens from the text into a vector space and uses the generated embeddings to identify one or more tokens as being associated with the one or more entities. The computing machine determines, using the trained machine learning model that identifies the one or more entities and based on the embedded tokens, an assertion applied, within the text, to at least one entity. The assertion is represented as a vector in a multi-dimensional space. Each dimension corresponds to a part of the assertion. The trained machine learning model is a span-level model that both identifies entities and determines assertions as predictions made on candidate spans of tokens rather than predictions made on each token individually (though some spans may comprise a single token). The computing machine provides an output associated with the assertion applied to the entity. According to some embodiments, both the NER engine and the part of the model responsible for making the assertions upon the entities are span-level models in that they make predictions on a whole span at once rather than applying a tag token by token.

During the training phase, a computing machine (which may be the same as or different from the computing machine used in the inference phase) accesses a first dataset comprising labeled entities in a first collection of text documents. The computing machine accesses a second dataset indicating assertions applied, within the first collection of text documents, to the labeled entities. Each assertion is represented as a vector in a multi-dimensional space. Each dimension corresponds to a part of the assertion. The computing machine trains, using a supervised learning engine, a machine learning model comprising a named entity recognition (NER) engine to identify entities in text, as well as an assertion layer to identify assertions applied, by the text, to identified entities. The training to identify the entities and the training to identify the assertions leverage backpropagation to backpropagate into a common embedding layer for both the entities and the assertions. The machine learning model is a span-level model that both identifies entities and determines assertions as predictions made on candidate spans of tokens rather than predictions made on each token individually (though some spans may comprise a single token). The computing machine provides an output representing the trained machine learning model.

As used herein, the term "entity" encompasses its plain and ordinary meaning. An entity may be an event or a character. A character may be a person or a group.

As used herein, the term "token" encompasses its plain and ordinary meaning. A token may be an instance of a sequence of text characters (e.g., American Standard Code for Information Interchange (ASCII) characters) in a text document that are grouped together as a useful semantic unit for processing. For example, in the phrase: "Friends, Romans, countrymen, lend me your ears," the tokens are: "Friends," "Romans," "countrymen," "lend," "me," "your," and "ears." In addition, the commas of the phrase, as well as any other punctuation marks in other phrases, may themselves be individual tokens. Sometimes, a token may include a part of a word. For example, the word "rewrite," may include two tokens: "re" and "write." The above are instances of possible tokenization. Different contextual embedding models (e.g., Bidirectional Encoder Representations from Transformers (BERT), Embeddings from Language Models (ELMo), etc.) might use different tokenization schemes. As used herein, the phrase "span of tokens" encompasses its plain and ordinary meaning. A span of tokens may include multiple contiguous tokens.

The technology disclosed herein uses various engines, each of which is constructed, programmed, configured, or otherwise adapted, to carry out a function or set of functions. The term "engine" as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

As used herein, the term "computing machine" may include a single computing machine or multiple computing machines. A computing machine may include any device or combination of devices that includes processing circuitry and memory. The processing circuitry and the memory may reside in the same device or in different devices.

Throughout this document, some method(s) (e.g., in FIGS. 7 and 9) are described as being implemented serially and in a given order. However, unless explicitly stated otherwise, the operations of the method(s) may be performed in any order. In some cases, two or more operations of the method(s) may be performed in parallel using any known parallel processing techniques. In some cases, some of the operation(s) may be skipped and/or replaced with other operations. Furthermore, skilled persons in the relevant art may recognize other operation(s) that may be performed in conjunction with the operation(s) of the method(s) disclosed herein.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of tokens of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, the machine-learning program 116 may be asked to count the number of sedans and pickup trucks in a parking lot between 10:00 and 11:00. The machine-learning program 116 determines the required image quality to extract the information that is needed. The machine-learning program 116 determines if a target model exists for sedans and pickup trucks. The machine-learning program 116 locates images having the required image quality to extract the information that is needed. If such images do not exist for the given time and geographic location parameters, the machine-learning program 116 requests collection of such images for the given time and geographic location parameters. Upon receiving the requested or located images, the machine-learning program 116 pushes the images to the appropriate model.

Machine learning techniques train models to accurately make predictions on data fed into the models. During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

Figure 2:
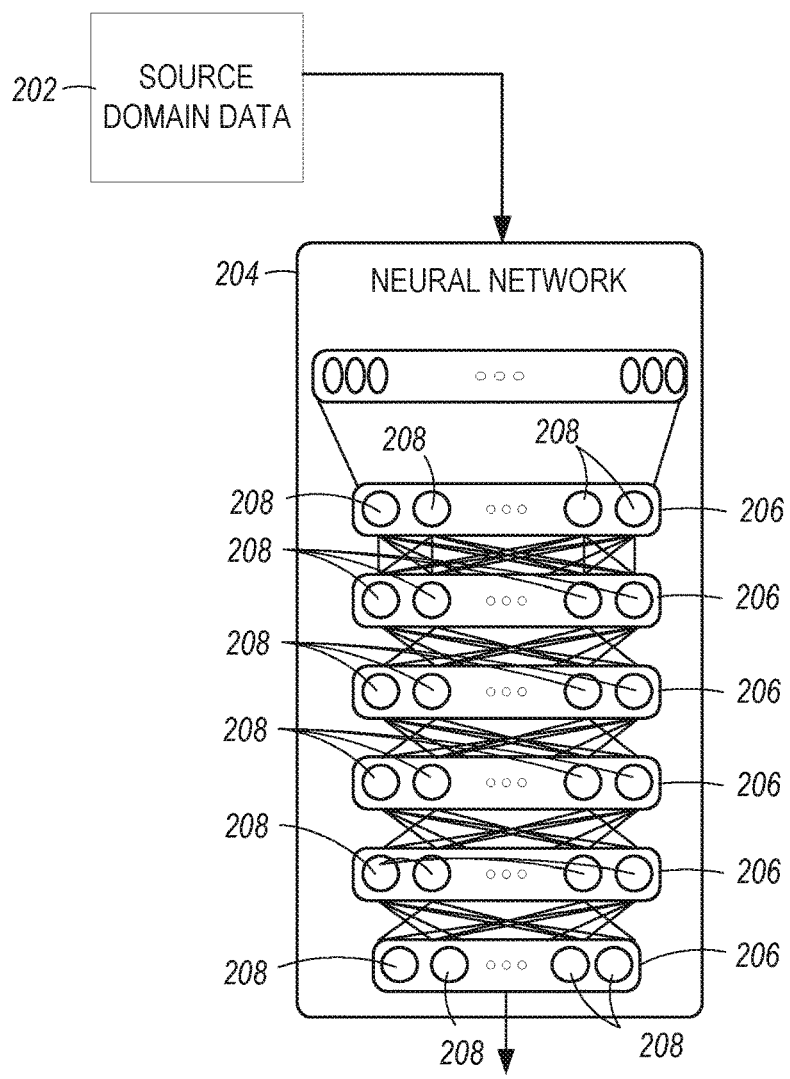
FIG. 2 illustrates an example neural network, in accordance with some embodiments.
Figure 2:
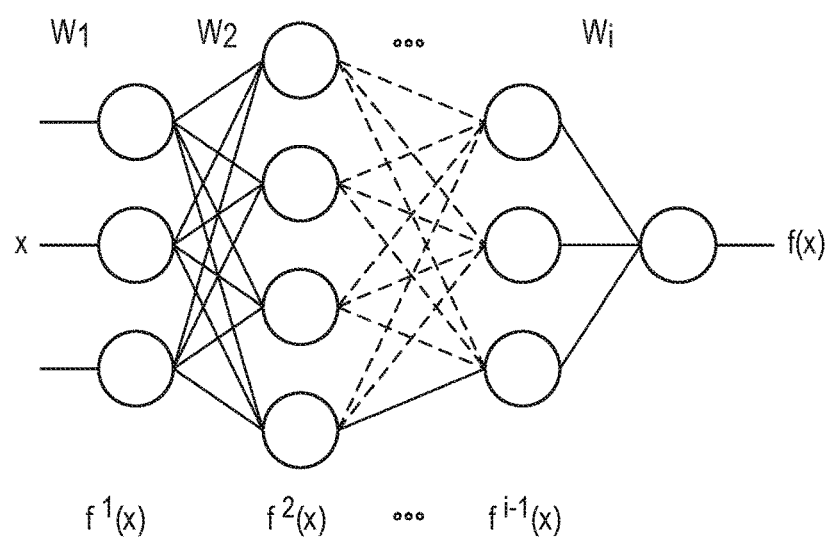

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1, W_2, \ldots, W_i$ are applied to the input to each layer to arrive at $f^1(x), f^2(x), \ldots, f^{i-1}(x)$, until finally the output $f(x)$ is computed.

In some example embodiments, the neural network 204 (e.g., deep learning, deep convolutional, or recurrent neural network) comprises a series of neurons 208. A neuron 208 is an architectural element used in data processing and artificial intelligence, particularly machine learning on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized in various configurations of neural networks to provide interactions and relationship learning modeling for how each of the frames in an utterance are related to one another.

For example, a neural network node serving as a neuron includes several gates to handle input vectors (e.g., sections of an image), a memory cell, and an output vector (e.g., contextual representation). The input gate and output gate control the information flowing into and out of the memory cell, respectively. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., patterns in an image). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DIN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
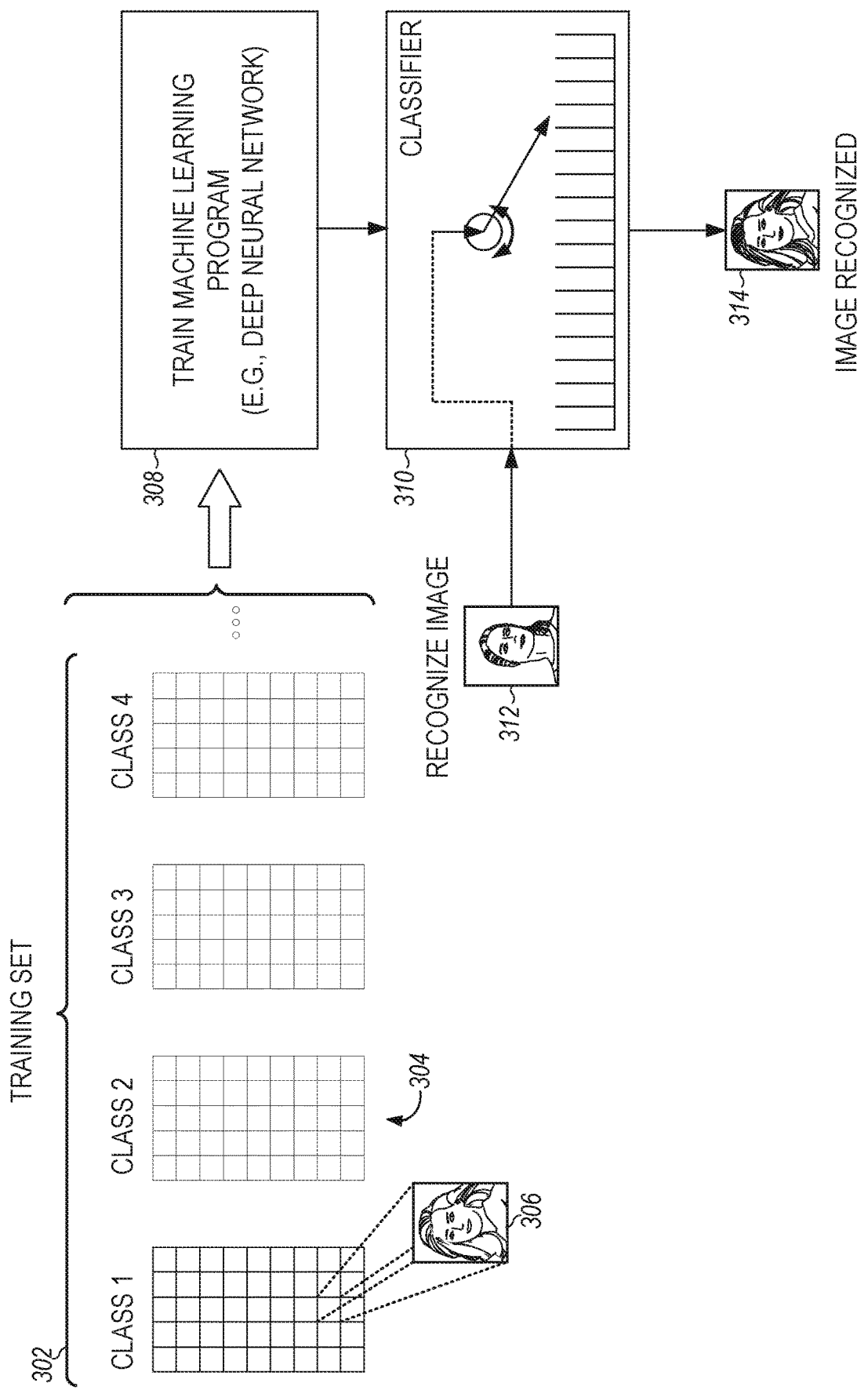
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
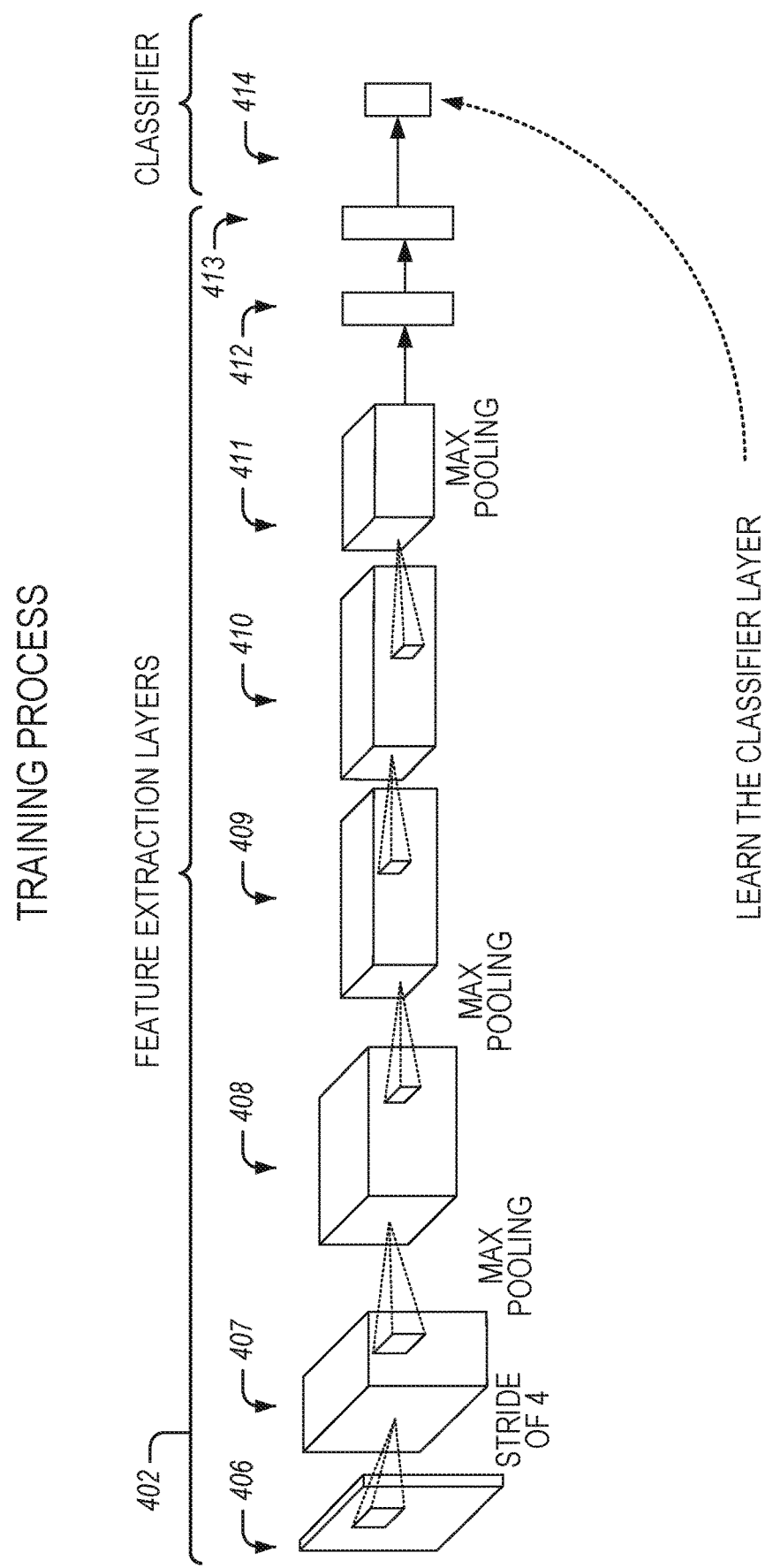
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., using the datasets MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

FIG. 4 is described in conjunction with a "stride of 4." However, it should be noted that any other positive integer stride value may be used. Also, FIG. 4 describes some but not all examples of stages of neural network processing. Some aspects of the technology disclosed herein may implement one or more of: convolution, skip connections, activation, batch normalization, dropout, and the predictive function. Skip connections include shortcuts to jump over some layers (e.g., layer m provides input directly to layer m+2). An activation is a minimum amount of input that causes an artificial neuron to "fire" an output. Batch normalization is a technique for training very deep neural networks that standardizes the inputs to a layer for each mini-batch. This has the effect of stabilizing the learning process and dramatically reducing the number of training epochs required to train deep networks. Dropout sets the output of some neurons to zero in order to prevent a neural network from overfitting. The idea of dropout is to randomly drop units (along with their connections) from the artificial neural network during training. This prevents the units from co-adapting too much.

Figure 5:
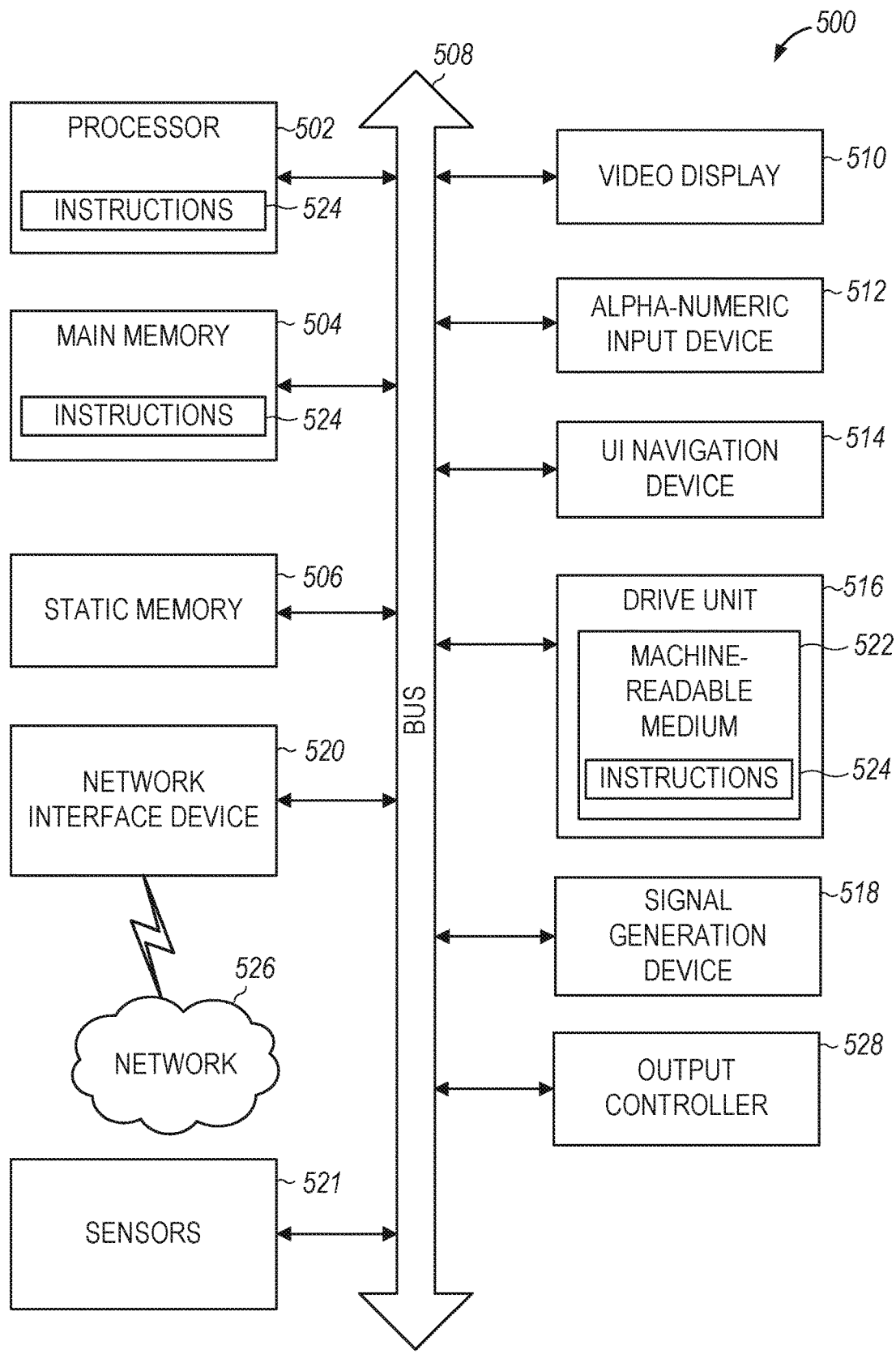
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically. Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

Figure 6:
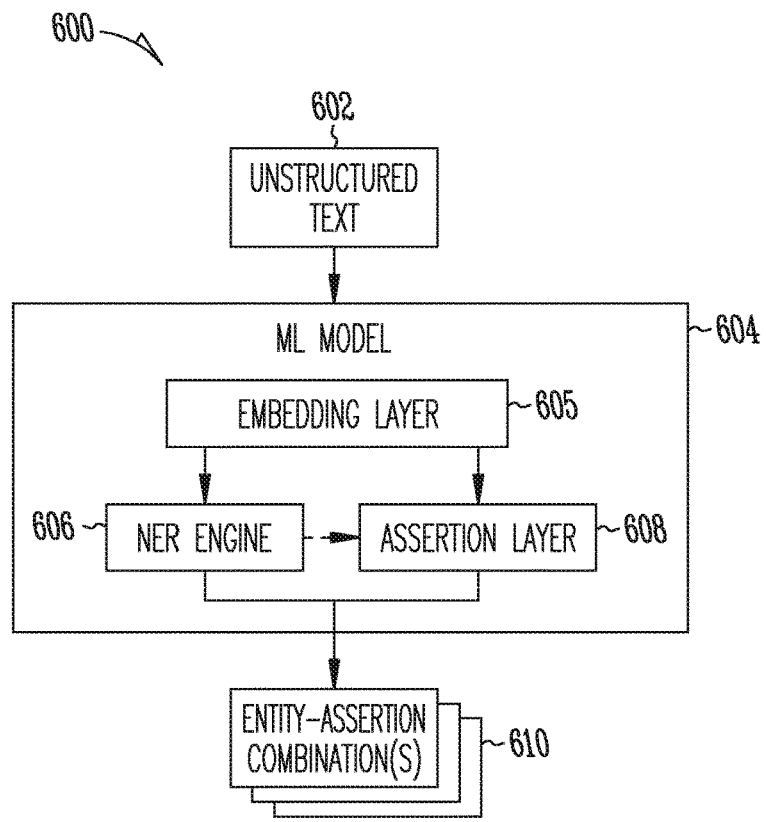
FIG. 6 is a data flow diagram for determining entity-assertion combinations in unstructured text.

FIG. 6 is a data flow diagram 600 for determining entity-assertion combinations in unstructured text. As shown in the data flow diagram 600, unstructured text 602 is provided as input to a machine learning (ML) model 604. The ML model 604 includes an embedding layer 605, a named entity recognition (NER) engine 606, and an assertion layer 608. The ML model 604 is a span-level model that both identifies entities (e.g., using NER engine 606) and determines assertions (e.g., using assertion layer 608) as predictions made on candidate spans of tokens rather than predictions made on each token individually (though some spans may comprise a single token). The ML model 604 generates entity-assertion combination(s) 610. Each entity-assertion combination 610 indicates a combination of an entity and an assertion. For example, if the unstructured text 602 includes: "Unlike our righteous Alice, Bob is a crook and should be put on a short leash," the entity-assertion combination(s) 610 may include the entity "Alice" coupled with the assertion "ingroup," due to the phrase "our . . . Alice." The entity-assertion combination(s) 610 may include the entity "Bob" coupled with the assertions "condemnation" and "dehumanization." Bob is condemned because he is "a crook" and dehumanized because he "should be put on a short leash."

As shown, the embedding layer 605 is common to both the NER engine 606 and the assertion layer 608. The assertion layer 608 may include one or more layers. The embedding layer 605 communicates with both the NER engine 606 and the assertion layer 608. In some embodiments, the NER engine 606 communicates identified entities to the assertion layer 608, and the assertion layer 608 determines assertions about the identified entities. Alternatively, the NER engine 606 and the assertion layer 608 may operate in parallel. The NER engine 606 and the assertion layer 608 together generate the entity-assertion combinations 610, which are the output of the ML model 604.

Some embodiments relate to the machine learning model 604 that (once trained) takes unstructured text 602 as input and (1) automatically identifies events and characters (i.e., people and groups) as well as (2) morally-relevant valences and attributes of the author toward said events and characters. Attributes different from moral attributes may also be used. For example, the technology may be used for quality attributes (e.g., in product or service reviews) or any other types of attributes.

One approach builds on the NER engine 606. In one aspect, in the same "sweep" as recognizing entities, the ML model 604 performs additional attribute (e.g., moral attribute or quality attribute) characterizations. The attribute characterizations are "about" the entities (e.g., characters and events) that the ML model 604 detects, which may include dehumanization, moral condemnation/justification, ingroup/outgroup, violence, harmed/responsible-for-harm, and more. The attributes are the assertions in the entity-assertion combination(s) 610, and are determined using the assertion layer 608. One motivation may be to detect linguistic indicators of imminent adverse action, for example, acting violently against some individual or group.

In one example, the unstructured text 602 includes: "Unlike our righteous Alice, Bob is a crook and should be put on a short leash." The NER engine 606 recognizes "Alice" and "Bob" as entities. Post-NER operations of the ML model 604 may include one or more of the following operations.

Some aspects identify (in the assertions of entity-assertion combinations 610) valence features about moral condemnation and justification as a single dimension (e.g., condemnation=−1, neutral=0, justification=1). Some aspects may report the ordinal values (−1, 0, 1) rather than real numbers in the [−1, 1] interval. In the above example, "Bob" would be marked as −1 (condemned), and "Alice" would be marked as 1 (justified). This may be called ordinal regression.

Some aspects identify (in the assertions of entity-assertion combinations 610) an ingroup/outgroup assertion. In the above example, "Alice" would be a 1 (ingroup) due to the "our" in the sentence context, and "Bob" would be a 0 (neural) on this dimension, since there was no explicit linguistic "move" to outgroup "Bob."

Some aspects identify (in the assertions of entity-assertion combinations 610) binary features, for example, about dehumanization, which is either present or absent. In this case, "Bob" is marked dehumanized due to the "put on a short leash" sentence context. "Alice" is unmarked.

These attributes/assertions are examples only and other moral or other attributes/assertions may be used. In the unstructured text 602, "The teapot has a convenient handle, but the spout is ugly," the entity "handle" may be assigned a positive attribute. However, the entity "spout" may be assigned a negative attribute.

Some machine-learned models infer numerical valences (e.g., sentiment or toxicity or politeness) about an entire passage. In some embodiments, the disclosed ML model 604 jointly identifies spanned elements in the text (e.g., "Bob", "Alice") and also assesses said spanned elements for numerical valences. Some embodiments do all of the above to infer features relevant to assessing the author's moral (or other attribute-based) disposition toward said elements. Compared with most other approaches, this is a much finer-grained analysis of elements within the text (or dispositions toward the elements within the text), compared with more popular whole-message classification and regression technologies.

The full ML model 604, including the NER engine 606 and the post-NER operations, is learned from labeled training examples. In some embodiments, there are no rules or knowledge of what comprises condemnation, outgrouping or dehumanization. This is learned entirely from the examples.

Some embodiments use neural modules in addition to a pre-trained Bidirectional Encoder Representations from Transformers (BERT) language model. The text passes through the BERT model. BERT computes a contextual meaning and the post-BERT layers (in some cases, there are at least two, one for NER and one for assertions) compute predictions about NER and assertions on the basis of the contextual meanings computed by BERT after the parameters of BERT are fine-tuned along with the post-BERT layers on the training data. This means "Bob" gets some of the "crook" signal in BERT's output layer, whereas "Alice" gets the "righteous" signal. The post-BERT elements may exploit these signals in their operation.

The ML model 604 may include multiple layers operative to produce activations of nodes based on feature sets derived from the span of tokens, and to further produce an output based on the activations, the output representing the entity-assertion combination(s) 610. For example, the ML model 604 may correspond to the machine learning models described in conjunction with FIGS. 1-4.

Some aspects are directed to the joint-recognition-with-ordinal-regression approach. This may be implemented in the domain of moral valence or in other domains. Some aspects are directed to the technique for moral assessment.

Figure 7:
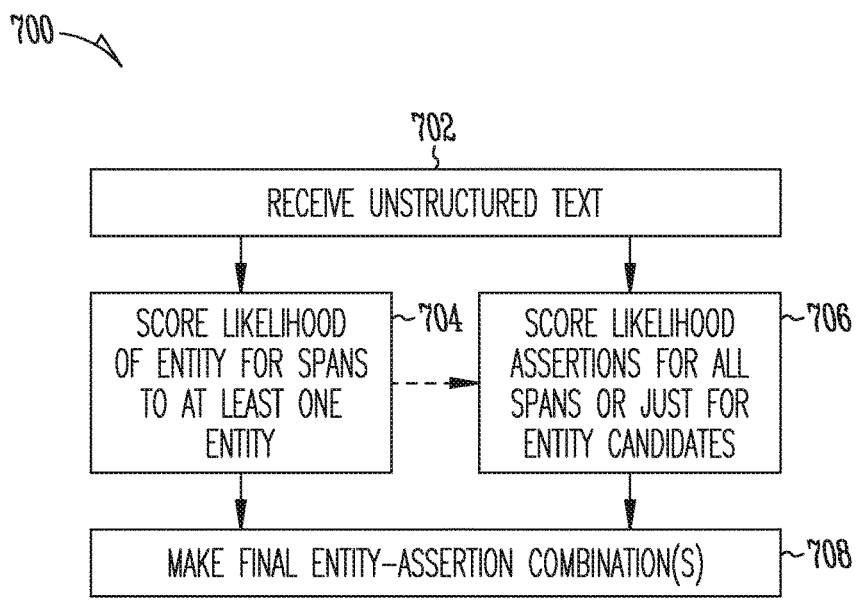
FIG. 7 is a flow chart of an inference method for joint recognition and assertion regression of elements in text, in accordance with some embodiments.

FIG. 7 is a flow chart of an inference method 700 for joint recognition and assertion regression of elements in text, in accordance with some embodiments.

At operation 702, a computing machine (e.g., one or more of the computing machines 500), which is being used for inference, receives an input comprising unstructured text 602.

At operation 704, the computing machine scores the likelihood of entities for spans. For example, the computing machine identifies, within the unstructured text, one or more entities using a NER engine 606 in a trained machine learning model 604. The trained machine learning model 604 embeds tokens from the text into a vector space and uses the generated embeddings to identify one or more tokens as being associated with the one or more entities. The trained machine learning model may have been trained, for example, using the training method 900 of FIG. 9 or another training method.

At operation 706, the computing machine scores a likelihood of assertions for all spans or just the entity candidates identified in operation 704. Alternatively, the operation 706 may be conducted in parallel with (or before) operation 704. The computing machine determines, using the trained machine learning model 604 that identifies the one or more entities and based on the embedded tokens, an assertion applied, within the text, to an entity that was identified using the NER engine 606. The assertion is represented as a vector in a multi-dimensional space. Each dimension corresponds to a part of the assertion. The trained machine learning model 604 is a span-level model that both identifies entities and determines assertions as predictions made on candidate spans of tokens rather than predictions made on each token individually (though some spans may comprise a single token).

At operation 708, the computing machine, based on the results of operations 704 and 706, makes the final determinations of the entity-assertion combination(s) 610, which are the output of the ML model. The computing machine provides an output associated with the assertion applied to the entity (e.g., the entity-assertion combination(s) 610). In some cases, upon failing to identify, using the trained machine learning model 604, any assertions having a significance value exceeding a threshold, the trained machine learning model 604 foregoes identifying any entities.

FIG. 7 described the operations of the method 700 being carried out in series and in a given order. However, in some cases, two or more of the operations may be carried out in parallel and/or the order of the operation may be changed. As described, the entities are identified and then only after the assertions are determined. However, some approaches can model the joint likelihood of entities and assertions, such that the information from the assertion layer 608 in the machine learning model influences the final decision about the entities.

In some embodiments, the computing machine determines the assertion by identifying, using the trained machine learning model 604, an attitude of the author of the unstructured text 602 toward the entity, and determining the assertion based on the identified attitude (and, in some cases, other things). The attitude may be implicit or explicit.

In some embodiments, the computing machine determines the assertion by identifying, using the trained machine learning model 604, a relation between the entity and an additional entity, and determining the assertion based on the identified relation (and, in some cases, other things).

In some examples, the assertion is a moral assertion applied by an author of the text to the at least one entity. The vector includes one or more integer or binary values. The integer or binary values represent one or more of: dehumanization, moral condemnation/justification, ingroup/outgroup, violence and harmed/responsible-for-harm.

In some examples, the trained machine learning model 604 includes a contextual language model (CLM) and at least one post-CLM layer. The post-CLM layer(s) compute the assertion based on a contextual meaning of the unstructured text determined in the CLM. At least one post-CLM layer is included in the NER engine. The CLM may be a Bidirectional Encoder Representations from Transformers (BERT) language model.

In the multi-dimensional space in which the assertion is represented, each dimension may be a vector, a Boolean value, a floating point value or an integer value. One example is illustrated in FIG. 8.

Figure 8:
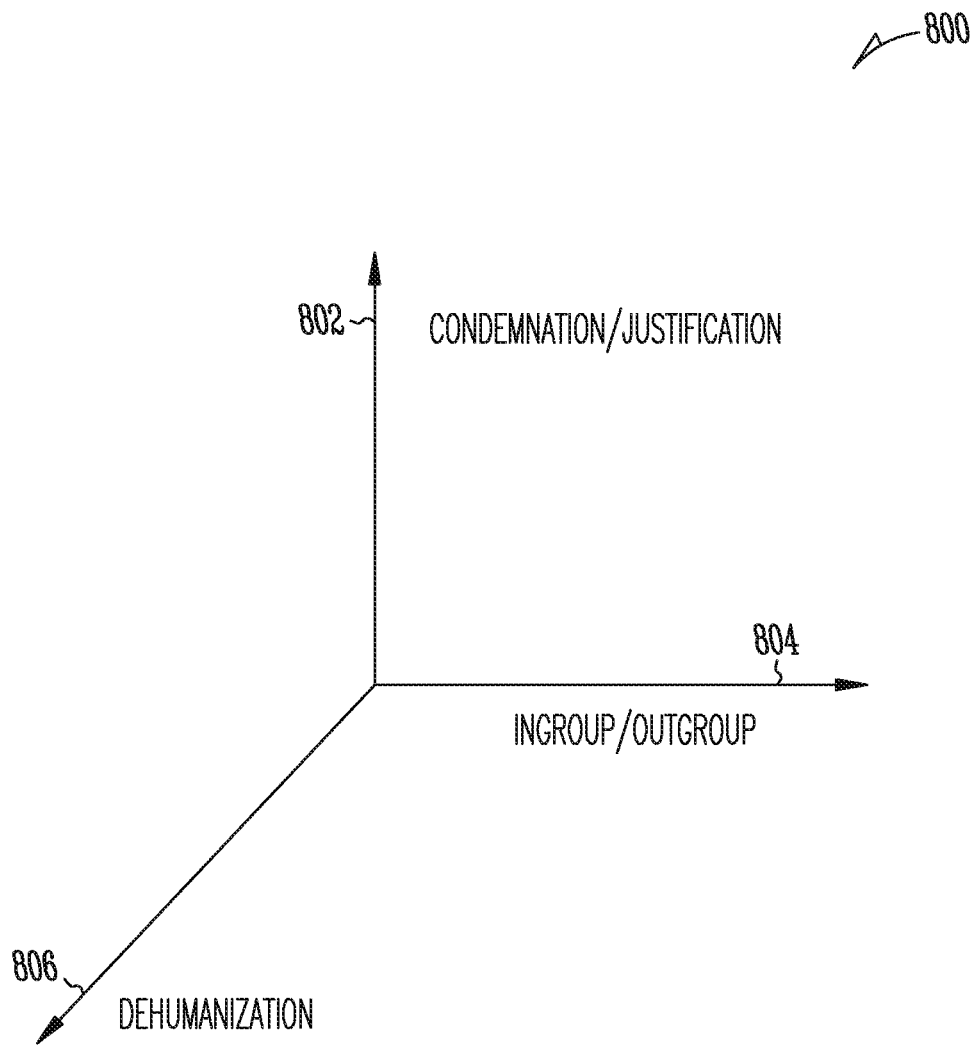
FIG. 8 illustrates an example multi-dimensional space in which an assertion may be represented, in accordance with some embodiments.

FIG. 8 illustrates an example multi-dimensional space 800 in which an assertion may be represented, in accordance with some embodiments. As shown, the space 800 has three dimensions: condemnation/justification 802, ingroup/outgroup 804, and dehumanization 806. The condemnation/justification dimension 802 may be a real number/floating point dimension with condemnation=−1, neutral=0, and justification=1. A value between −1 and 1 on the condemnation/justification dimension 802 may correspond to a probability or a log-odds that an entity is condemned or justified. The ingroup/outgroup dimension 804 may operate similarly to the condemnation/justification dimension 802, with outgroup=1−1, neutral=0, and ingroup=1. A value between −1 and 1 on the ingroup/outgroup dimension 804 may correspond to a probability or a log-odds that an entity is identified as being in the ingroup or outgroup. The dehumanization dimension 806 may be a Boolean dimension with FALSE or 0 representing dehumanization being absent and TRUE or 1 representing dehumanization being present. Alternatively, the dehumanization dimension 806 may correspond to a real number/floating point value associated with a probability or log-odds of dehumanization being present. In some cases, a vector of multiple values may be used for one or more of the above dimensions 802, 804, and 806. The dimensions 802, 804, and 806 are provided as examples. Other dimensions and/or a different number of dimensions may be used in conjunction with the technology disclosed herein. For example, a violence dimension and/or a harmed/responsible-for-harm dimension may be added to the space 800.

Figure 9:
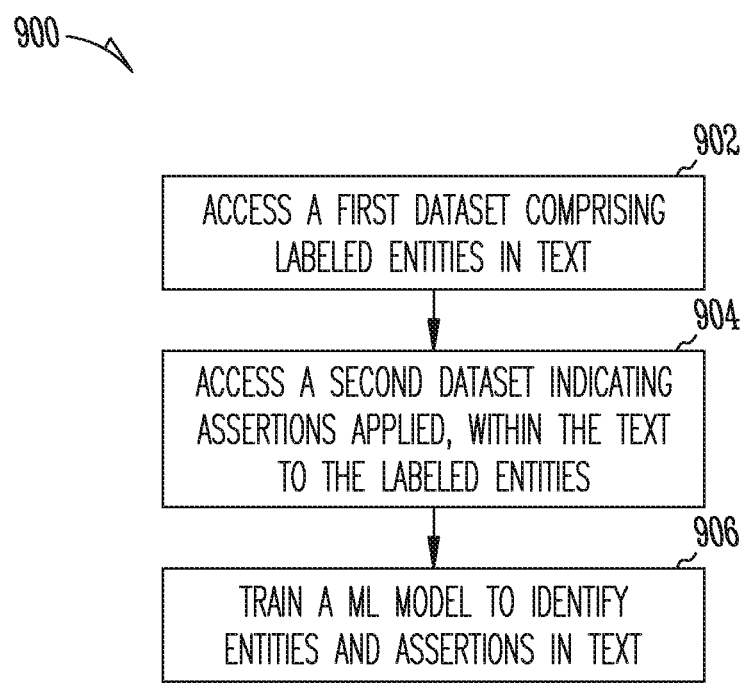
FIG. 9 is a flow chart of a training method for joint recognition and assertion regression of elements in text, in accordance with some embodiments.

FIG. 9 is a flow chart of a training method 900 for joint recognition and assertion regression of elements in text, in accordance with some embodiments.

At operation 902, a computing machine (e.g., one or more of the computing machines 500, which may be the same as or different from the computing machine used in the method 700 of FIG. 7), which is being used for training, accesses a first dataset comprising labeled entities in a first collection of text documents.

At operation 904, the computing machine accesses a second dataset indicating assertions applied, within the first collection of text documents, to the labeled entities. Each assertion is represented as a vector in a multi-dimensional space. Each dimension corresponds to a part of the assertion.

At operation 906, the computing machine trains, using a supervised learning engine, a machine learning model (e.g., ML model 604) comprising a NER engine (e.g., NER engine 606) to identify entities in text and an assertion layer (e.g., assertion layer 608) to determine assertions applied, by the text, to identified entities. The training to identify the entities and the training to identify the assertions leverage backpropagation to backpropagate into a common embedding layer for both the entities and the assertions. The machine learning model is a span-level model that both identifies entities and determines assertions as predictions made on candidate spans of tokens rather than predictions made on each token individually (though some spans may comprise a single token). The computing machine provides an output representing the trained machine learning model.

Figure 10:
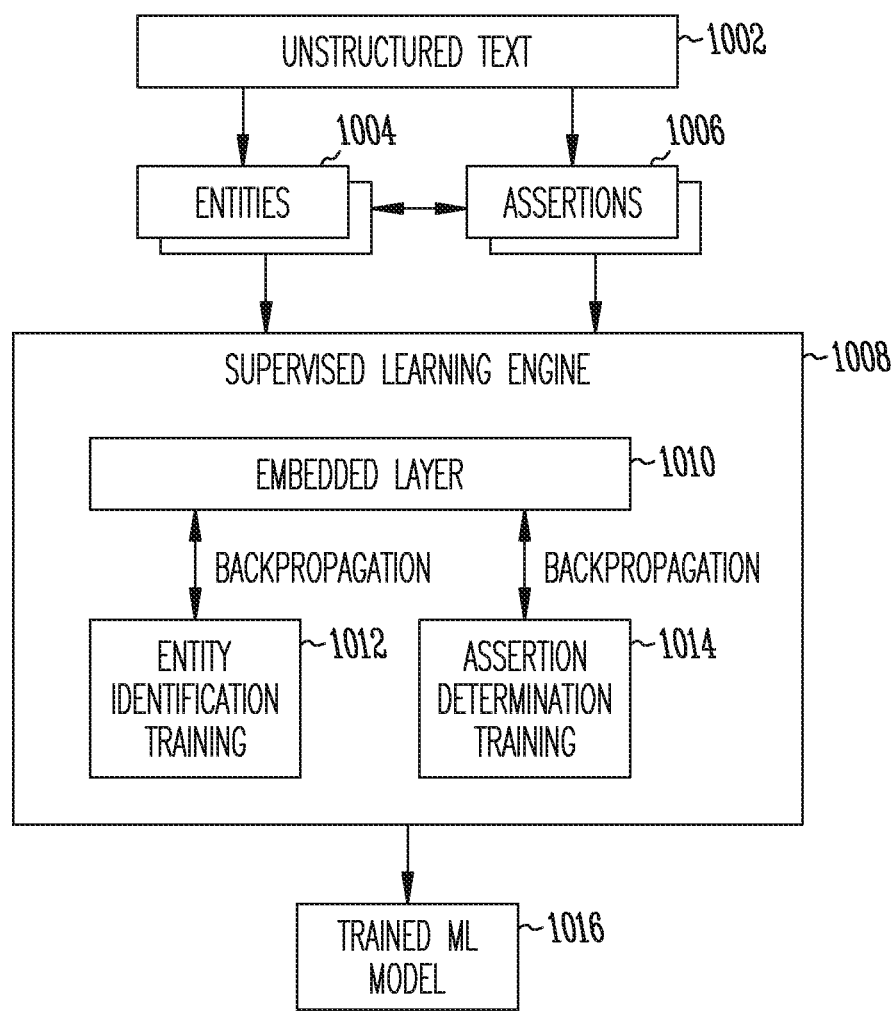
FIG. 10 is a data flow diagram for training a machine learning model for joint recognition and assertion regression of elements in text, in accordance with some embodiments.

FIG. 10 is a data flow diagram 1000 for training a machine learning model for joint recognition and assertion regression of elements in text, in accordance with some embodiments.

As shown in FIG. 10, a computing machine being used for training accesses unstructured text 1002. Entities 1004 and assertions 1006 about the entities are labeled in the unstructured text 1002, using human labeler(s) or other artificial intelligence model(s). The labeled entities 1004 and assertions 1006 are provided to a supervised learning engine 1008.

As shown, the supervised learning engine 1008 includes an embedding layer 1010, entity identification training 1012, and assertion determination training 1014. The entities identification training 1012 and the assertions determination training 1014 leverage backpropagation to backpropagate into the same embedding layer 1010 for both the entities and the assertions. In some examples, the supervised learning engine 1008 leverages multitask learning.

The supervised learning engine 1008 outputs the trained ML model 1016. The trained ML model 1016 may be used as the ML model 604 described in conjunction with FIG. 6. In some embodiments, the trained ML model 1016 operates by embedding tokens from the text into a vector space and using the generated embeddings to identify identifying one or more tokens as being associated with the entities. The trained Mt model 1016 identifies assertions based on the embedded tokens.

Some embodiments are described below as numbered examples (Example 1, 2, 3 . . . ). These examples are provided as examples only and do not limit the disclosed technology.

Example 1 is an inference method comprising: receiving, at one or more computing machines, an input comprising unstructured text; identifying, within the unstructured text, one or more entities using a named entity recognition (NER) engine in a trained machine learning model, wherein the trained machine learning model embeds tokens from the text into a vector space and uses generated embeddings to identify one or more tokens as being associated with the one or more entities; determining, using the trained machine learning model that identifies the one or more entities and based on the embedded tokens, an assertion applied, within the text, to at least one entity, wherein the assertion is represented as a vector in a multi-dimensional space, wherein each dimension corresponds to a part of the assertion, wherein the trained machine learning model is a span-level model that both identifies the one or more entities and determines the assertion based on candidate spans of tokens; and providing an output associated with the assertion applied to the at least one entity.

In Example 2, the subject matter of Example 1 includes, wherein the assertion comprises a moral assertion applied by an author of the text to the at least one entity, wherein the vector comprises one or more integer or binary values, the integer or binary values representing one or more of: dehumanization, moral condemnation/justification, ingroup/outgroup, violence, and harmed/responsible-for-harm.

In Example 3, the subject matter of Examples 1-2 includes, wherein the trained machine learning model comprises a contextual language model (CLM) and at least one post-CLM layer, wherein the at least one post-CLM layer computes the assertion based on a contextual meaning of the unstructured text determined in the CLM, wherein at least one post-CLM layer is included in the NER engine.

In Example 4, the subject matter of Example 3 includes, wherein the CLM comprises a Bidirectional Encoder Representations from Transformers (BERT) language model.

In Example 5, the subject matter of Examples 1-4 includes, wherein the one or more entities comprise one or more events or one or more characters.

In Example 6, the subject matter of Example 5 includes, wherein the one or more characters comprise persons or groups.

In Example 7, the subject matter of Examples 1-6 includes, wherein determining the assertion applied to the at least one entity comprises: identifying, using the trained machine learning model, an attitude of an author of the text toward the at least one entity; and determining the assertion based on at least the identified attitude, wherein the attitude is implicit or explicit.

In Example 8, the subject matter of Examples 1-7 includes, wherein determining the assertion applied to the at least one entity comprises: identifying, using the trained machine learning model, a relation between the at least one entity and at least one additional entity; and determining the assertion based on at least the identified relation.

In Example 9, the subject matter of Examples 1-8 includes, wherein at least one candidate span of tokens comprises a contiguous sequence of tokens.

In Example 10, the subject matter of Examples 1-9 includes, wherein at least one dimension comprises a vector, a Boolean value, a floating point value or an integer value.

In Example 11, the subject matter of Examples 1-10 includes, wherein the trained machine learning model comprises a plurality of layers operative to produce activations of nodes based on feature sets derived from the candidate spans of tokens, and to further produce an output based on the activations, the output representing the at least one entity and the assertion applied to the at least one entity.

In Example 12, the subject matter of Examples 1-11 includes, upon failing to identify, using the trained machine learning model, any assertions having a significance value exceeding a threshold: foregoing identifying, using the trained machine learning model, any entities.

Example 13 is a training method comprising: accessing, at one or more computing machines, a first dataset comprising labeled entities in a first collection of text documents; accessing, at the one or more computing machines, a second dataset indicating assertions applied, within the first collection of text documents, to the labeled entities, wherein each assertion is represented as a vector in a multi-dimensional space, wherein each dimension corresponds to a part of the assertion; training, using a supervised learning engine, a machine learning model comprising a named entity recognition (NER) engine to identify entities in text and assertions applied, by the text, to identified entities, wherein the training to identify the entities and the training to determine the assertions leverage backpropagation to backpropagate into a common embedding layer for both the entities and the assertions, wherein the machine learning model is a span-level model that both identifies entities and determines assertions based on candidate spans of tokens; and providing an output representing the trained machine learning model.

In Example 14, the subject matter of Example 13 includes, wherein training the machine learning model leverages multitask learning.

In Example 15, the subject matter of Examples 13-14 includes, wherein the machine learning model embeds tokens into the text and identifies one or more tokens as being associated with the entities, wherein the machine learning model identifies assertions based on the embedded tokens.

Example 16 is at least one machine-readable medium including instructions that, when executed by processing circuitry, cause the processing circuitry to perform operations to implement of any of Examples 1-15.

Example 17 is an apparatus comprising means to implement of any of Examples 1-15.

Example 18 is a system to implement of any of Examples 1-15.

Example 19 is a method to implement of any of Examples 1-15.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed. Description, it can be seen that various features are grouped together in a single embodiment for the purpose of streamlining the disclosure. This method of disclosure is not to be interpreted as reflecting an intention that the claimed embodiments require more features than are expressly recited in each claim Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An inference method comprising:
 receiving, at one or more computing machines, an input comprising unstructured text;
 identifying, within the unstructured text, one or more entities using a named entity recognition (NER) engine in a trained machine learning model, wherein the trained machine learning model embeds tokens from the unstructured text into a vector space and uses generated embeddings to identify one or more tokens as being associated with the one or more entities, wherein the one or more tokens associated with the one or more entities in the unstructured text correspond to candidate spans of tokens;
 determining, based on the embedded tokens and using the trained machine learning model that identifies the one or more entities and determines assertions as predictions made on the candidate span of tokens, an assertion applied, within the text, to at least one entity, wherein the assertion is represented as a vector, wherein each dimension of multiple dimensions of the vector corresponds to a part of the assertion and has a value corresponding to a probability or a log-odds of the part of the assertion being present, wherein the trained machine learning model is a span-level model; and
 providing an output associated with the assertion applied to the at least one entity, wherein the assertion comprises a moral assertion applied by an author of the text to the at least one entity, wherein the vector comprises one or more integer or binary values, the integer or binary values representing one or more of: dehumanization, moral condemnation/justification, ingroup/outgroup, violence, and harmed/responsible-for-harm.

2. The method of claim 1, wherein the trained machine learning model comprises a contextual language model (CLM) and at least one post-CLM layer, wherein the at least one post-CLM layer computes the assertion based on a contextual meaning of the unstructured text determined in the CLM, wherein at least one post-CLM layer is included in the NER engine.

3. The method of claim 2, wherein the CLM comprises a Bidirectional Encoder Representations from Transformers (BERT) language model.

4. The method of claim 1, wherein the one or more entities comprise one or more events or one or more characters.

5. The method of claim 4, wherein the one or more characters comprise persons or groups.

6. The method of claim 1, wherein determining the assertion applied to the at least one entity comprises:
identifying, using the trained machine learning model, an attitude of an author of the text toward the at least one entity; and
determining the assertion based on at least the identified attitude, wherein the attitude is implicit or explicit.

7. The method of claim 1, wherein determining the assertion applied to the at least one entity comprises:
identifying, using the trained machine learning model, a relation between the at least one entity and at least one additional entity; and
determining the assertion based on at least the identified relation.

8. The method of claim 1, wherein at least one candidate span of tokens comprises a contiguous sequence of tokens.

9. The method of claim 1, wherein at least one dimension comprises a vector, a Boolean value, a floating point value or an integer value.

10. The method of claim 1, wherein the trained machine learning model comprises a plurality of layers operative to produce activations of nodes based on feature sets derived from the candidate spans of tokens, and to further produce an output based on the activations, the output representing the at least one entity and the assertion applied to the at least one entity.

11. The method of claim 1, further comprising:
upon failing to identify, using the trained machine learning model, any assertions having a significance value exceeding a threshold: foregoing identifying, using the trained machine learning model, any entities.

12. A non-transitory machine-readable medium storing instructions which, when executed by one or more machines, cause the one or more machines to perform operations comprising:
receiving, at one or more computing machines, an input comprising unstructured text;
identifying, within the unstructured text, one or more entities using a named entity recognition (NER) engine in a trained machine learning model, wherein the trained machine learning model embeds tokens from the unstructured text into a vector space and uses generated embeddings to identify one or more tokens as being associated with the one or more entities, wherein the one or more tokens associated with the one or more entities in the unstructured text correspond to candidate spans of tokens;
determining, based on the embedded tokens and using the trained machine learning model that identifies the one or more entities and determines assertions as predictions made on the candidate span of tokens, an assertion applied, within the text, to at least one entity, wherein the assertion is represented as a vector, wherein each dimension of multiple dimensions of the vector corresponds to a part of the assertion and has a value corresponding to a probability or a log-odds of the part of the assertion being present, wherein the trained machine learning model is a span-level model; and
providing an output associated with the assertion applied to the at least one entity, wherein the assertion comprises a moral assertion applied by an author of the text to the at least one entity, wherein the vector comprises one or more integer or binary values, the integer or binary values representing one or more of: dehumanization, moral condemnation/justification, ingroup/outgroup, violence, and harmed/responsible-for-harm.

13. The machine-readable medium of claim 12, wherein the trained machine learning model comprises a contextual language model (CLM) and at least one post-CLM layer, wherein the at least one post-CLM layer computes the assertion based on a contextual meaning of the unstructured text determined in the CLM, wherein at least one post-CLM layer is included in the NER engine.

14. The machine-readable medium of claim 13, wherein the CLM comprises a Bidirectional Encoder Representations from Transformers (BERT) language model.

15. The machine-readable medium of claim 12, wherein the one or more entities comprise one or more events or one or more characters.

* * * * *